United States Patent
Shore et al.

(10) Patent No.: US 9,802,557 B2
(45) Date of Patent: Oct. 31, 2017

(54) METHOD AND APPARATUS FOR PROVIDING VEHICLE COMPONENT FAULT SCORING

(71) Applicant: Clever Devices, Woodbury, NY (US)

(72) Inventors: Kirk Alexander Shore, Rock Spring, GA (US); Philip P. Piazza, Hauppauge, NY (US)

(73) Assignee: Clever Devices, Ltd, Woodbury, NY (US)

( * ) Notice: Subject to any disclaimer, the term of this patent is extended or adjusted under 35 U.S.C. 154(b) by 0 days.

(21) Appl. No.: 14/888,843

(22) PCT Filed: May 3, 2013

(86) PCT No.: PCT/US2013/039506
§ 371 (c)(1),
(2) Date: Nov. 3, 2015

(87) PCT Pub. No.: WO2014/178879
PCT Pub. Date: Nov. 6, 2014

(65) Prior Publication Data
US 2016/0052470 A1    Feb. 25, 2016

(51) Int. Cl.
*G01M 17/00*    (2006.01)
*B60R 16/023*    (2006.01)
(Continued)

(52) U.S. Cl.
CPC ...... *B60R 16/0232* (2013.01); *B60R 16/0234* (2013.01); *G06Q 50/30* (2013.01);
(Continued)

(58) Field of Classification Search
CPC ... B60R 16/0232; B60R 16/0234; G07C 5/06; G07C 5/08; G07C 5/0808; G07C 5/12
(Continued)

(56) References Cited

U.S. PATENT DOCUMENTS 4,517,639 A * 5/1985 Ferrell ................ G06F 11/181
                                                         244/194
5,844,473 A * 12/1998 Kaman .................... G08G 1/20
                                                         340/439

(Continued)

FOREIGN PATENT DOCUMENTS

EP        1690762       10/2011
KR    1020120114605    10/2012

OTHER PUBLICATIONS

PCT/ISA/210 Search Report issued on PCT/US2013/039506 (pp. 3).
PCT/ISA/237 Written Opinion issued on PCT/US2013/039506 (pp. 7).

*Primary Examiner* — Shardul Patel
(74) *Attorney, Agent, or Firm* — The Farrell Law Firm, P.C.

(57) ABSTRACT

A method and an apparatus are provided for providing a vehicle component fault score. Faults that occur on vehicle components in a plurality of vehicles are tracked. One or more sets of attribute values are compiled for the tracked faults. A set of attribute values is collected for each item within one or more preset vehicle categories. A fault score is calculated for each set of the compiled attribute values. A set of one or more items with respective fault scores is displayed based on a preset vehicle category selected by a user.

18 Claims, 4 Drawing Sheets

(51) Int. Cl.
*G07C 5/08* (2006.01)
*G07C 5/06* (2006.01)
*G07C 5/12* (2006.01)
*G06Q 50/30* (2012.01)

(52) U.S. Cl.
CPC .............. *G07C 5/06* (2013.01); *G07C 5/08* (2013.01); *G07C 5/0808* (2013.01); *G07C 5/12* (2013.01)

(58) Field of Classification Search
USPC .................................... 701/29.1; 702/184
See application file for complete search history.

(56) References Cited

U.S. PATENT DOCUMENTS

| | | | |
|---|---|---|---|
| 2002/0059075 A1* | 5/2002 | Schick | B61L 27/0094 701/31.4 |
| 2003/0065771 A1* | 4/2003 | Cramer | G06Q 10/06 709/224 |
| 2006/0025966 A1* | 2/2006 | Kanamaru | G07C 5/008 702/184 |
| 2007/0159314 A1* | 7/2007 | Zhu | B60C 23/0408 340/442 |
| 2010/0017167 A1* | 1/2010 | Duc | G05B 23/0251 702/185 |
| 2012/0065874 A1* | 3/2012 | Sato | B60R 16/0236 701/123 |
| 2012/0253586 A1* | 10/2012 | Sakakibara | G07C 5/085 701/29.2 |

* cited by examiner

METHOD AND APPARATUS FOR PROVIDING VEHICLE COMPONENT FAULT SCORING

BACKGROUND OF THE INVENTION

1. Field of the Invention

The present invention relates generally to a vehicle diagnostic system, and more particularly, to a method and an apparatus for providing vehicle component fault scoring.

2. Description of the Related Art

Transportation means are a required part of everyday life in many parts of the world and, in particular, urban environments. Such transportation means include, for example, public transit systems, commercial fleets, and rental agencies. It is important for managers of such transportation means to be aware of the maintenance and performance of vehicles in their fleet so that the transit system may continue to operate on a predetermined transit schedule, for example. However, due to the number of vehicles and the number of vehicle components that must be monitored and maintained, it is difficult to sustain a current diagnostic, maintenance, and/or performance log.

It is also beneficial for managers to be aware of diagnostics relating to maintenance, and/or performance issues that repeatedly occur in specific vehicle types or components, or at specific vehicle dispatch points or depots. Specifically, maintenance and operations departments need to quickly assess risk and prioritize workflow. It is critical to maximize an available transit fleet for revenue service. In order to maintain enough vehicles for revenue service, a maintenance department requires diagnostic information necessary to focus mechanics on vehicles that have the greatest risk of failure. However, when there are not enough vehicles in a state of good repair to support revenue service, the operations department may be required to request vehicles from the maintenance department. The maintenance department again requires diagnostic information to assess risk and provide vehicles to satisfy the service demand.

SUMMARY OF THE INVENTION

The present invention has been made to address at least the above problems and/or disadvantages and to provide at least the advantages described below. Accordingly, an aspect of the present invention provides a method and apparatus for providing vehicle component fault scoring.

According to one aspect of the present invention, a method is provided for providing a vehicle component fault score. Faults that occur on vehicle components in a plurality of vehicles are tracked. One or more sets of attribute values are compiled for the tracked faults. A set of attribute values is collected for each item within one or more preset vehicle categories. A fault score is calculated for each set of the compiled attribute values. A set of one or more items with respective fault scores is displayed based on a preset vehicle category selected by a user.

According to another aspect of the present invention, an apparatus is provided for providing a vehicle component fault score. The apparatus includes a transceiver tracking faults that occur on vehicle components in a plurality of vehicles, and a memory storing the tracked faults. The apparatus also includes at least one processor coupled to the memory, the transceiver, and a display, and operative to: (i) compile one or more sets of attribute values for the tracked faults, and (ii) calculate a fault score for each set of the compiled attribute values, wherein a set of attribute values is collected for each item within one or more preset vehicle categories. The apparatus further includes the display displaying a set of one or more items with respective fault scores based on a preset vehicle category selected by a user.

According to a further aspect of the present invention, an article of manufacture is provided for providing a vehicle component fault score, which includes a machine readable medium containing one or more programs which when executed implement the steps of: tracking faults that occur on vehicle components in a plurality of vehicles; compiling one or more sets of attribute values for the tracked faults, wherein a set of attribute values is collected for each item within one or more preset vehicle categories; calculating a fault score for each set of the compiled attribute values; and displaying a set of one or more items with respective fault scores based on a preset vehicle category selected by a user.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. Detailed descriptions of constructions or processes known in the art may be omitted to avoid obscuring the subject matter of the present invention. Further, in the following description of the present invention, various specific definitions found in the following description are provided only to provide a general understanding of the present invention, and it is apparent to those skilled in the art that the present invention can be implemented without such definitions.

The embodiments of the present invention employ a scoring system that allows maintenance and operations departments to quickly assess risk and prioritize workflow by, for example, allowing a maintenance department to, at a glance, focus their mechanics on a group of vehicles having the greatest threat of failure. This allows the operations department to maintain enough vehicles for revenue service, and provides the greatest return on investment of resources.

When the operations department is required to request vehicles from the maintenance department, accurate scoring of normalized vehicle health enables the maintenance department to assess risk and provide vehicles in real time to satisfy the service demand.

The scoring system of the embodiments of the present invention also allows executives of transit systems to assess fleet-wide health of vehicles at a glance, and to have insight into the primary challenges that threaten a state of good repair. These executives may use the scoring system to enact policy throughout the entire maintenance organization, effectively putting all teams on the same page at the same time. Policies may also be changed and implemented automatically.

Figure 1:
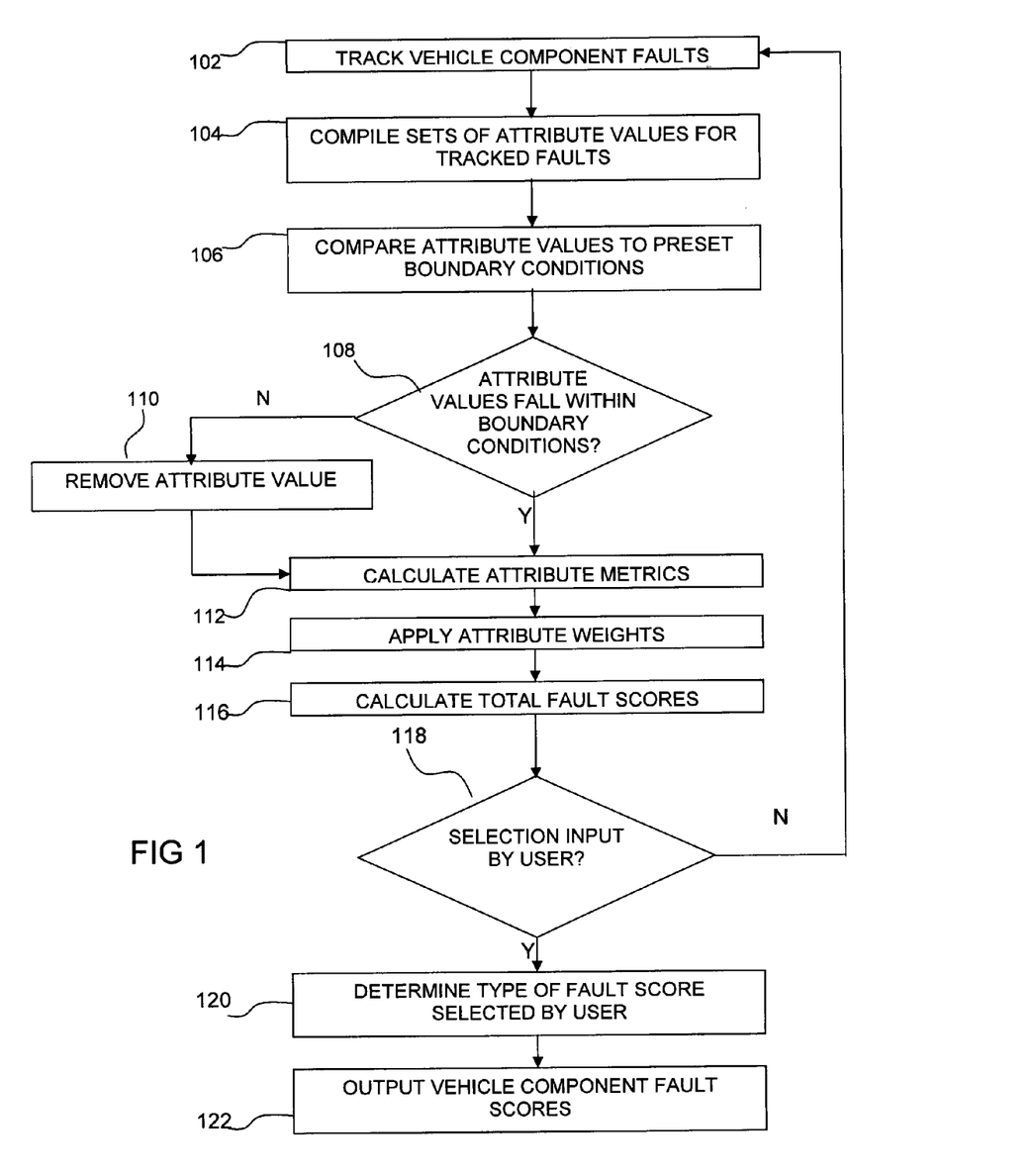
FIG. 1 is a flowchart illustrating a method of providing a vehicle component fault score, according to an embodiment of the present invention.

Referring initially to FIG. 1, a flowchart illustrates a method of providing a vehicle component fault score, according to an embodiment of the present invention. Initially, at step 102, faults that occur in vehicle components are tracked for all vehicles in a transit system. Faults may be tracked by requesting fault information from a system that receives information from vehicle operators or from vehicle devices that detect vehicle component faults. In an alternate embodiment of the present invention, fault information may be automatically received directly from the above-described vehicle devices. The transit system may be embodied as a networked transit system that provides public transit with specified vehicles, such as, for example, a bus transit system.

In an embodiment of the present invention, attribute values include, for example, hours of vehicle operation, a sum of fault durations, a fault count, a sum of fault ages, and a maximum fault severity. However, embodiments of the present invention are not limited to the above-described attribute values. Any attribute value may be compiled that is meaningful in determining a fault level or score.

Fault severity is represented by a user-configurable value range. For example, the value range may include severity values from 1-10. Fault severity, defined by the Society of Automotive Engineers (SAE) and the Original Equipment Manufacturers (OEM), includes levels of "warning" and "critical". Fault severity may also be indicated by an icon having a specific lamp color. For example, a fault severity value of 5 for a given component corresponds to a fault severity level of "warning" and a yellow or amber indicator lamp color. Further, a fault severity value of 10 corresponds to a fault severity level of "critical" and a red indicator lamp color.

Attribute values including, for example, a fault severity, a fault count, and a fault duration, are set forth below for specific tracked faults.

| Bus | Type | Comp. | Model | Fault Descr. | Flash-code | Severity | Count | Duration |
|---|---|---|---|---|---|---|---|---|
| 4876 | New Flyer 2011 Xcelsior Diesel [20] | ABS | WABCO E-Series | ECU supply voltage is too low | 8 + 1 | ⬤ | 6 | 00:00:05 |
| 4011 | Daimler Orion VII NG (Li-Ion) [8] | Engine | Cummins CM2150 | Engine Coolant Temperature-Data Valid but Above Normal Operational Range-Most Severe Level. Engine coolant temperature signal indicates engine coolant temperature above engine protection critical limit. | 151 | ⬤ | 3 | 00:01:24 |

In step 104, sets of attribute values are compiled for the tracked faults. Specifically, according to an embodiment of the present invention, a set of attribute values may be compiled for each type of vehicle, for each vehicle component, for each vehicle depot, and for each vehicle. However, embodiments of the present invention are not limited to the above-described sets of attribute values. A set of attribute values may be compiled for any vehicle category that may be useful in tracking vehicle component faults.

In step 106, individual attribute values are compared to a respective one of preset boundary conditions assigned to individual attributes. The preset boundary conditions may define a maximum value, minimum value, or specific range of values for the attribute values. For example, in an embodiment of the present invention, a compiled attribute value for a sum of fault durations is compared to a preset maximum value for the sum of fault durations. A preset boundary condition may be individually set for one, some, or all of the fault attributes. A sample set of boundary conditions is set forth below:

Max Fault Duration (sec)
Max Frequency (fault/hr)
Max Hours
Max Days
Min Operating Hours In step 108, it is determined whether corresponding attribute values fall within the respective preset boundary conditions. When it is determined that an attribute value does not fall within a respective preset boundary condition for that attribute, that attribute value is removed, in step 110. When it is determined that an attribute value falls within a respective preset boundary condition for that attribute in step 108, and after attribute values are removed in step 110, the methodology proceeds to step 112. However, in an alternate embodiment of the present invention, no preset boundary conditions are set, and the methodology proceeds from step 104 to step 112, skipping steps 106-110.

In step 112, individual metrics are calculated for attribute values. More specifically, a metric is computed for each attribute within a set of attributes. All individual metrics have a maximum value of 1. The metrics include, for example, a frequency score, a duration score, an age score, and a severity score.

The frequency score relates to the number of faults that occurred per hour of operation. The number of hours of vehicle operation is calculated within the boundary conditions of maximum frequency and maximum operating hours. The total number of faults are summed and divided by the vehicle operating hours. This calculated frequency is weighted based upon where the vehicle operating hours fall within the boundary condition of maximum operating hours. The Weighted Frequency (WF) is then divided by the boundary condition of maximum frequency to determine the frequency score. A methodology, according to an embodiment of the present invention, for calculating the frequency score is set forth below.

Frequency=Fault Count/Operating Hours.

Operating Hours/Max Operating Hours>0.75;
WF=1*Frequency.

0.75>=Operating Hours/Max Operating Hours>0.5;
WF=0.75*Frequency.

0.5>=Operating Hours/Max Operating Hours>0.25;
WF=0.5*Frequency.

Operating Hours/Max Operating Hours<=0.25;
WF=0.25*Frequency.

Frequency Score=WF/Max Fault per Hour.

The duration score relates to the total amount of time each individual fault event is active. The total amount of time faults are active on a vehicle is divided by the boundary condition of maximum fault duration in order to calculate the duration score. All 0 duration records are eliminated from the calculation to avoid artificially low calculated values.

The age score relates to the age of the fault, and is scored based on the relative age of the fault within the boundary condition of maximum hours. A difference between a date time stamp and a current time is calculated, and an age score is determined based upon where this difference compares to the boundary condition of maximum hours. A methodology, according to an embodiment of the present invention, for calculating the age score is set forth below.

Date Time Diff<=0.2*Max Hours; Age Score=1

0.2<Date Time Diff<=0.4*Max Hours; Age Score=0.5

0.4<Date Time Diff<=0.6*Max Hours; Age Score=0.25

0.6<Date Time Diff<=0.8*Max Hours; Age Score=0.125

Date Time Diff>0.8*Max Hours; Age Score=0.06

Else; Age Score=0

When Date Time Stamp is null; Age Score=0

The severity score relates to a severity value of the fault based upon a severity range defined in the customer's configuration. The max severity is a severity value that represents the highest possible fault severity, or maximum severity score available in the customer's configuration. The severity value of each fault occurrence is divided by the max severity to calculate the severity score.

In step 114, attribute weights are applied to corresponding attribute scores. Specifically, an attribute weight is applied to scores for that individual attribute. Attribute weights may be set for one, some, or all of the attributes, as long as the weights total 1. However, in an alternate embodiment of the present invention, no attribute weights are provided, and the methodology skips step 112. A sample set of attribute weights is set forth below:

Age Weight=0.10
Duration Weight=0.30
Frequency Weight=0.50
Severity Weight=0.10

In step 116, a total fault score is calculated for each vehicle type, each vehicle component, each vehicle depot, and each vehicle from the corresponding sets of weighted attribute scores. As described above, embodiments of the present invention are not limited to the above-described sets of attribute values and corresponding fault scores.

A total score is calculated based on the above-described metrics and corresponding weights. Qualification checks may be performed before finalizing a total score. For example, it may be confirmed that vehicles are active for fleet service, and that faults are enabled. Step 106 previously confirmed that the faults are within the ranges defined by the boundary conditions. A check is also performed to ensure that no individual score is greater than 1. A total score is calculated by multiplying each attribute score by a corresponding weight, summing the result, and multiplying by 100, as set forth in Equation (1) below.

$$\text{Total Score}=((\text{Age Score}*\text{Age Weight})+(\text{Duration Score}*\text{Duration Weight})+(\text{Frequency Score}*\text{Frequency Weight})+(\text{Severity Score}*\text{Severity Weight}))*100 \quad (1)$$

In summary, according to an embodiment of the present invention, total scores are calculated based on the information collected in the table set forth below:

| Attribute/Measure | Note |
| --- | --- |
| Operating Hrs | Hours of operation based on engine operation within the time boundary |
| Fault Duration | Sum of the duration for faults |
| Fault Count | Count of faults |
| Fault Age Sum | Sum of the fault ages in hours |
| Fault Severity Max | Maximum fault severity |
| Max Severity | Maximum fault severity considered by the calculation |
| Age Score | Calculated age score |
| Frequency Score | Calculated frequency score |
| Duration Score | Calculated duration score |
| Severity Score | Calculated severity score |
| TotalScore | Calculated total score |

It is determined whether a selection is input by a user, in step 118. When it is determined that a selection is not input by the user, the methodology returns to step 102 to track component faults for all vehicles in the transit system. When it is determined that a selection is input by the user, the type of fault score selected by the user is determined, in step 120. More specifically, the system determines whether the user has selected output of vehicle type fault scores, vehicle component fault scores, vehicle depot fault scores, or vehicle fault scores. As described above, embodiments of the present invention are not limited to the above-described fault score groupings.

In step 122, the system outputs one or more vehicle component fault values relating to one or more individual vehicle types, individual vehicle components, individual vehicle depots, and individual vehicles. The output of the vehicle component fault values is described in greater detail below with respect to FIGS. 2-6.

As described below with respect to FIGS. 2-6, a user is first presented with a series of fault scores for vehicle types. When the user selects a vehicle type, the user is presented with a series of fault scores for vehicle components of the selected vehicle type. When the user selects a vehicle component, the user is presented with a series of fault scores for vehicle depots having the selected vehicle type with the selected vehicle component. When the user selects a vehicle depot, the user is presented with a series of fault scores for vehicles of the selected vehicle type, having the selected vehicle component, and in the selected vehicle depot. Embodiments of the present invention are not limited to the above-described selection hierarchy. Alternate embodiments of the present invention may provide a differently ordered selection hierarchy. Further, a different selection hierarchy may be provided, since embodiments of the present invention are not limited to the above-described sets of attribute values and fault scores.

Figure 2:
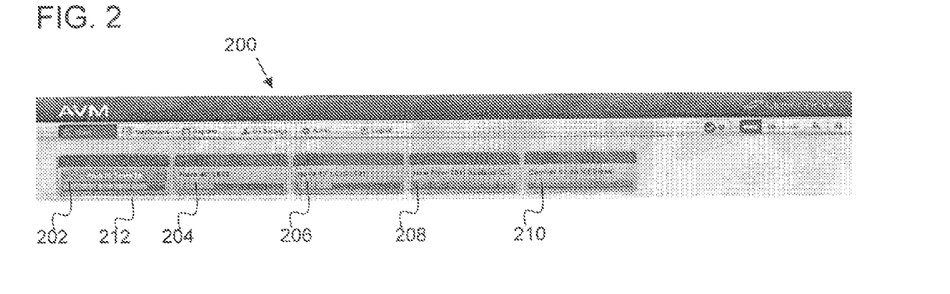
FIG. 2 is a screenshot of vehicle component fault scoring that is output for each vehicle type, according to an embodiment of the present invention.

FIG. 2 is a screenshot of vehicle component fault scoring that is output for each vehicle type, according to an embodiment of the present invention. Specifically, FIG. 2 shows vehicle component fault scores for five different types of vehicles used in the transit system.

A screen 200 displays five vehicle types, specifically, MCI D-Series Coach 202, Nova 40' L608 204, Nova 40' L620/L621 206, New Flyer 2011 Xcelsior 208, and Daimler Orion VII Diesel 210. Embodiments of the present invention are not limited to the above-described vehicle types. Alternate embodiments of the present invention may include any number of types and any vehicle type used in the associated transit system.

Each vehicle type includes a fault score meter 212 having a series of bars. The higher the fault score for the vehicle type, the more bars that are filled in the fault score meter. Specifically, the MCI D-Series Coach 202 has five of six bars filled in the fault score meter 212, the Nova 40' L608 204 has two of six bars filled in its fault score meter, the Nova 40' L620/L621 206 has two of six bars filled in its fault score meter, the New Flyer 2011 Xcelsior 208 has six of six bars filled in its fault score meter, and the Daimler Orion VII Diesel 210 has six of six bars filled in its fault score meter. Accordingly, by viewing the fault score meters, a user is able to quickly ascertain which vehicle types have the highest and lowest fault scores.

The fault score meter 212 may also be color-coded. Specifically, a range of lowest fault scores are associated with a single bar filled in green, while a range of highest fault scores are associated with all six bars filled in red. The intermediate score ranges are associated with two to five filled bars having colors ranging from lighter green, to yellow, to orange, as the fault score and the number of filled bars increases.

When the MCI D-Series Coach 202 is selected by the user, or when a cursor of the user passes over the MCI D-Series Coach 202, a numeric fault score of the MCI D-Series Coach 202 is displayed. Specifically, in the embodiment of the present invention shown in FIG. 2, a fault score of "73" is displayed overlapping the label for the MCI D-Series Coach 202. Selection of the MCI D-Series Coach 202 results in the display of a vehicle component screen, as described in greater detail below with respect to FIG. 3.

Figure 3:
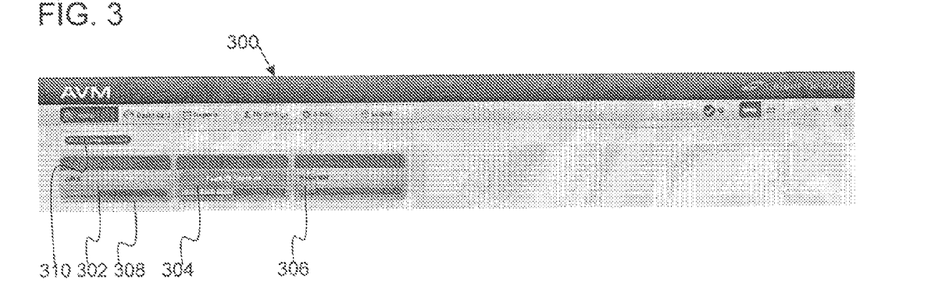
FIG. 3 is a screenshot of vehicle component fault scoring that is output for each vehicle component, according to an embodiment of the present invention.

FIG. 3 is a screenshot of vehicle component fault scoring that is output for each vehicle component, according to an embodiment of the present invention. Specifically, FIG. 3 shows vehicle component fault scores for each type of vehicle component of a previously selected vehicle type.

A screen 300 displays three vehicle components, ABS 302, engine 304, and retarder 306. Embodiments of the present invention are not limited to the above-described vehicle components. Alternate embodiments of the present invention may include any number of components and any vehicle component used in the associated transit system. When a different vehicle type is selected, a different combination of vehicle components may be displayed.

The ABS 302 has two of six bars filled in a fault score meter 308, the engine 304 has three of six bars filled in its fault score meter, and the retarder 306 has one of six bars filled in its fault score meter. The fault score meter 308 may also be color-coded, as described above with respect to FIG. 2. The screen 300 also includes a header 310 that indicates that the displayed components are of the previously selected MCI D-Series Coach.

When the engine 304 is selected by the user, or when a cursor of the user passes over the engine 304, a numeric fault score of the engine 304 is displayed. Specifically, in the embodiment of the present invention shown in FIG. 3, a fault score of "44" is displayed overlapping the label for the engine 304. Selection of the engine 304 results in the display of a vehicle depot screen, as described in greater detail below with respect to FIG. 4.

Figure 4:
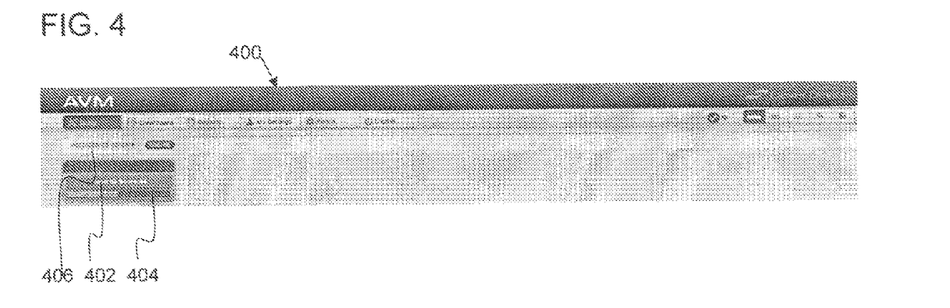
FIG. 4 is a screenshot of vehicle component fault scoring that is output for each vehicle dispatch location or depot, according to an embodiment of the present invention.

FIG. 4 is a screenshot of vehicle component fault scoring that is output for each vehicle depot, according to an embodiment of the present invention. Specifically, FIG. 4 shows vehicle component fault scores for each vehicle depot having a previously selected vehicle type with a previously selected vehicle component.

A screen 400 displays a single vehicle depot, castleton 402. Embodiments of the present invention are not limited to the above-described vehicle depot. Alternate embodiments of the present invention may include any number of vehicle depots and any vehicle depot used in the associated transit system. When a different vehicle type or vehicle component is selected, a different combination of vehicle depots may be displayed.

The castleton 302 has three of six bars filled in a fault score meter 404. The fault score meter 404 may also be color-coded, as described above with respect to FIG. 2. The screen 400 also includes a header 406 that indicates that the displayed vehicle depot has previously selected MCI D-Series Coach vehicles with engine components.

When the castleton 402 is selected by the user, or when a cursor of the user passes over the castleton 402, a numeric fault score of the castleton 402 is displayed. Specifically, in the embodiment of the present invention shown in FIG. 4, a fault score of "44" is displayed overlapping the label for the castleton 402. Selection of the castleton 402 results in the display of a vehicle screen, as described in greater detail below with respect to FIG. 5.

Figure 5:
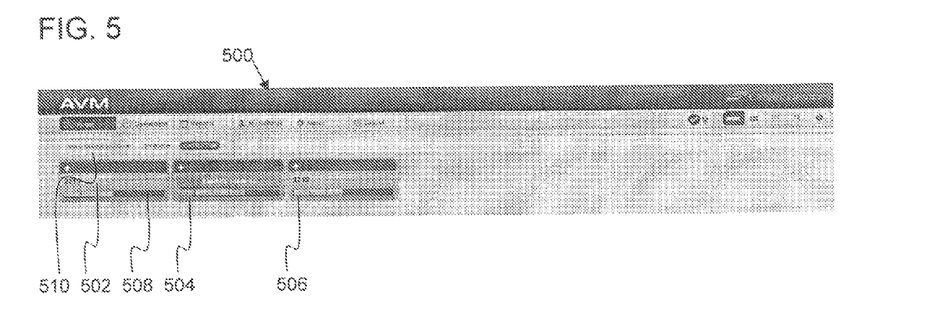
FIG. 5 is a screenshot of vehicle component fault scoring that is output for each vehicle, according to an embodiment of the present invention.

FIG. 5 is a screenshot of vehicle component fault scoring that is output for each vehicle, according to an embodiment of the present invention. Specifically, FIG. 5 shows vehicle component fault scores for each vehicle of a previously selected vehicle type, having a previously selected vehicle component, and in a previously selected vehicle depot.

A screen 500 displays three vehicles, vehicle 2210 502, vehicle 2211 504, and vehicle 2212 506. Embodiments of the present invention are not limited to the above-described vehicles. Alternate embodiments of the present invention may include any number of vehicles and any vehicles used in the associated transit system. When a different vehicle type, vehicle component, or vehicle depot is selected, a different combination of vehicles may be displayed.

The vehicle 2210 502 has three of six bars filled in a fault score meter 508, the vehicle 2211 504 has four of six bars filled in its fault score meter, and the vehicle 2212 506 has three of six bars filled in its fault score meter. The fault score meter 508 may also be color-coded, as described above with respect to FIG. 2. The screen 500 also includes a header 510 that indicates that the displayed vehicles are previously selected MCI D-Series Coach vehicles with engine components in Castleton.

When the vehicle 2211 504 is selected by the user, or when a cursor of the user passes over the vehicle 2211 504, a numeric fault score of the vehicle 2211 504 is displayed. Specifically, in the embodiment of the present invention shown in FIG. 5, a fault score of "53" is displayed overlapping the label for the vehicle 2211 504. Selection of the vehicle 2211 504, by clicking a corresponding "+", for example, results in the display of a detailed vehicle screen, as described in greater detail below with respect to FIG. 6.

Figure 6:
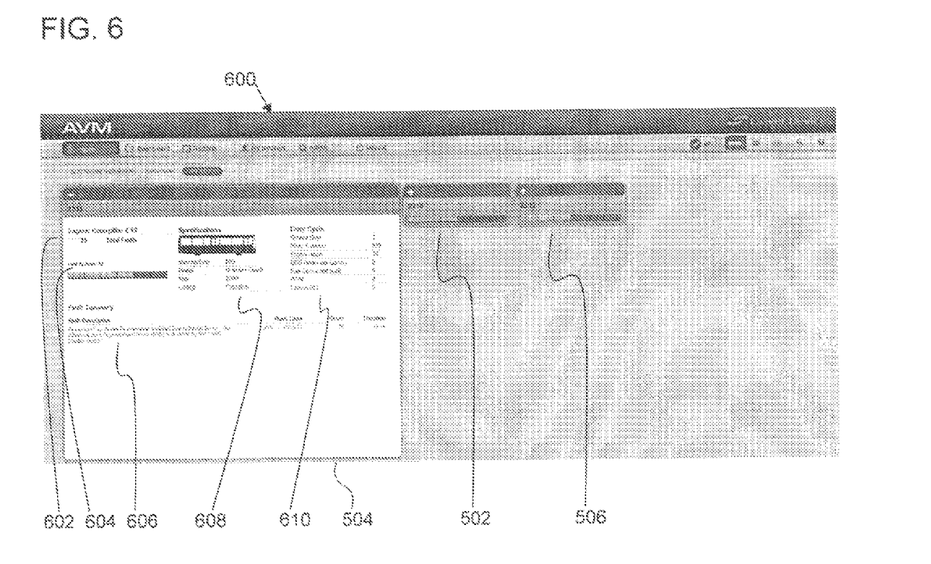
FIG. 6 is a screenshot of vehicle component fault scoring that is output for a selected vehicle, according to an embodiment of the present invention.

FIG. 6 is a screenshot of vehicle component fault scoring that is output for a selected vehicle, according to an embodiment of the present invention. Specifically, FIG. 6 shows detailed vehicle information for a previously selected vehicle, of a previously selected vehicle type, having a previously selected component, and in a previously selected vehicle depot.

A screen 600 displays the three vehicles, specifically, vehicle 2210 502, the vehicle 2211 504, and the vehicle 2212 506. The vehicle 2211 504 was previously selected, and its screen has been expanded to display detailed information. The detailed information includes an engine type and total engine faults 602 (selected vehicle component). The detailed information also includes a fault score "53" and corresponding fault score meter 604. The detailed information additionally includes a fault summary 606, which provides a fault description, a flash code, a fault count, and a fault duration. The detailed information further includes vehicle specifications 608, which includes a manufacturer, a model, a year, and a garage (or depot) of the vehicle. The detailed information also includes a duty cycle 610, which includes information relating to service days, miles traveled, engine hours, Miles Per Gallon (MPG), fuel consumed, Particulate Carbon per Mile (PC/M), and carbon. Embodiments of the present invention are not limited to the above-described detailed information. In accordance with an embodiment of the present invention, clicking a corresponding "−" will close the detailed information. Further, clicking a "+" of another vehicle will close the detailed information of the current vehicle and open the detailed information of the other vehicle. Alternate embodiments of the present invention may include any type of detailed information relevant to the vehicle and the associated transit system.

Figure 7:
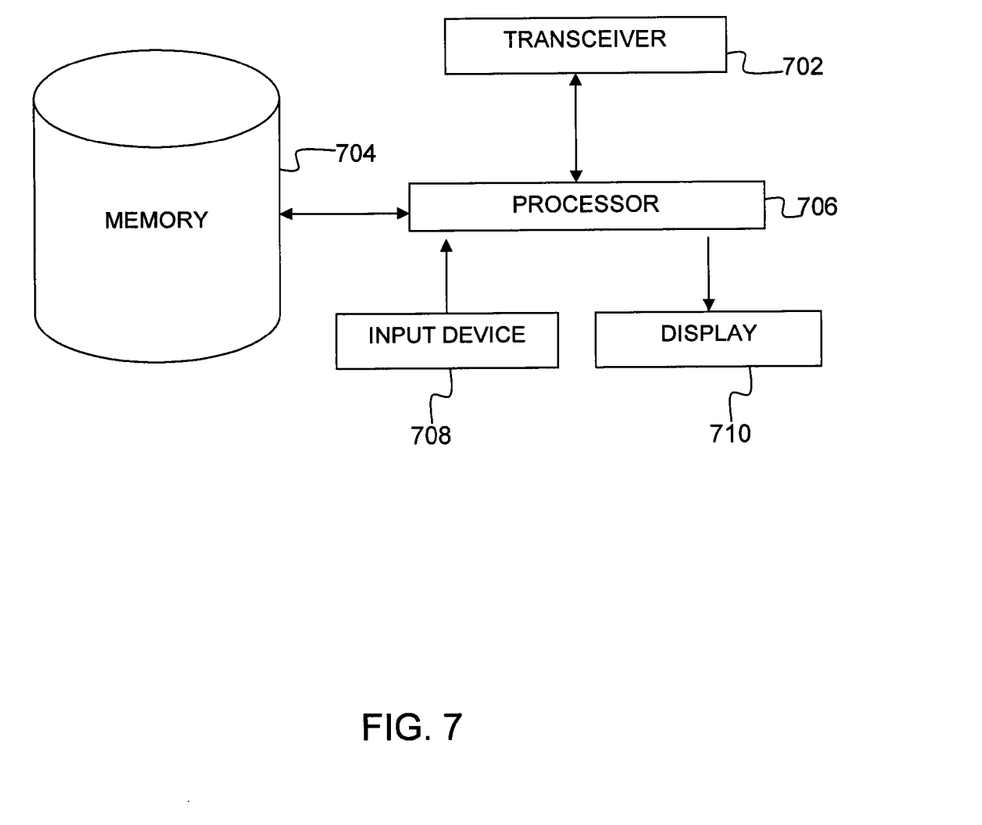
FIG. 7 is a block diagram illustrating an apparatus for providing a vehicle component fault score, according to an embodiment of the present invention.

Referring now to FIG. 7, a block diagram illustrates an illustrative hardware implementation of an apparatus in accordance with which one or more components/methodologies of the invention (e.g., components/methodologies described in the context of FIGS. 1-6) may be implemented. Specifically, FIG. 7 is a diagram illustrating an apparatus for providing a vehicle component fault score, according to an embodiment of the present invention. As shown, the apparatus may be implemented in accordance with a transceiver 702, a memory 704, a processor 706, an input device 708, and a display 710.

The apparatus includes a transceiver 702 for tracking faults that occur on vehicle components via a network interface, as described above with respect to step 102 of FIG. 1. More specifically, the transceiver may transmit a request for and receive information from a central system that monitors faults entered manually through vehicle maintenance or faults detected and/or entered automatically by individual vehicle devices. In another embodiment of the present invention, the transceiver may automatically receive vehicle component faults detected by the individual vehicle devices.

The apparatus also includes a memory 704 for storing the received faults or fault information. The apparatus further includes a processor 706 for compiling attribute values for each of the faults, comparing attribute values with preset boundary conditions, applying weights to the attribute values within the boundary conditions, calculating fault scores, and determining a type of user selection, as described above with respect to steps 104-118 of FIG. 1.

Additionally, the apparatus includes an input device 708 that receives selection information from a user, as described above with respect to FIGS. 2-6. The apparatus also includes an output device, such as, for example, a display 710, for displaying fault scores selected for display by the user, as described above with respect to step 120 in FIG. 1, and FIGS. 2-6.

It is to be appreciated that the term "processor" as used herein is intended to include any processing device, such as, for example, one that includes a Central Processing Unit (CPU) and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, Random Access Memory (RAM), Read Only Memory (ROM), a fixed memory device (e.g., hard drive), a removable memory device (e.g., diskette), flash memory, etc.

In addition, the phrase "input device" as used herein is intended to include, for example, one or more input devices for entering, for example, information associated with user selection, into the processing unit. Still further, the phrase "network interface" as used herein is intended to include, for example, one or more transceivers to permit the apparatus to communicate with another computer system via an appropriate communications protocol. This may provide access to computer systems that provide information regarding vehicle component faults.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for providing a vehicle component fault score, the method comprising the steps of:
   tracking, by a transceiver of an apparatus, faults that occur on vehicle components in a plurality of vehicles;
   compiling, by a processor of the apparatus, one or more sets of attribute values for the tracked faults, wherein a set of attribute values within a respective preset boundary condition is collected for each item within one or more preset vehicle type categories;

calculating, by the processor, a fault score for each set of the compiled attribute values; and displaying, by a display of the apparatus, a set of one or more items with respective fault scores based on a preset vehicle type category selected by a user, wherein compiling the one or more sets of attribute values comprises:
  comparing an attribute value to a respective preset boundary condition;
  determining whether the attribute value is within the respective preset boundary condition; and
  removing the attribute value, when the attribute value is not within the respective preset boundary condition, and wherein the fault scores are calculated without the removed attribute value.

2. The method of claim 1, wherein the one or more preset vehicle categories comprise one or more of vehicle types, vehicle components, vehicle depots, and vehicles.

3. The method of claim 1, wherein the attribute values comprise one or more of hours of vehicle operation, a sum of fault durations, a count of faults that occurred, a sum of fault ages, and a maximum fault severity.

4. The method of claim 1, wherein the respective preset boundary condition comprises a maximum attribute value.

5. The method of claim 1, wherein calculating the fault score comprises:
  calculating an attribute score for each attribute in the one or more sets using the attribute values and one or more boundary conditions;
  applying a preset attribute weight to the attribute score for each attribute in the one or more sets to generate a weighted attribute score for each attribute in the one or more sets; and
  summing the weighted attributes in each of the one or more sets to obtain fault scores for each of the one or more sets.

6. The method of claim 1, further comprising:
  determining whether the user selected the preset vehicle category;
  continuing to track faults, when the user has not selected the preset vehicle category; and
  determining the set of one or more items and corresponding fault scores of the preset vehicle category selected by the user, when the preset vehicle category is selected by the user.

7. The method of claim 1, wherein displaying the set of one or more items and corresponding fault scores comprises:
  displaying a fault score meter having a plurality of bars for each fault score.

8. The method of claim 1, wherein displaying the set of one or more items and corresponding fault scores comprises:
  displaying a numeric fault score, when the user selects an item of the preset vehicle category.

9. The method of claim 1, further comprising:
  displaying a next set of one or more items and respective fault scores of another preset vehicle category, when the user selects an item from the preset vehicle category.

10. An apparatus for providing a vehicle component fault score, comprising:
  a transceiver tracking faults that occur on vehicle components in a plurality of vehicles;
  a memory storing the tracked faults;
  at least one processor coupled to the memory, the transceiver, and a display, and operative to: (i) compile one or more sets of attribute values for the tracked faults, and (ii) calculate a fault score for each set of the compiled attribute values, wherein the a set of attribute values within a respective preset boundary condition is collected for each item within one or more preset vehicle type categories; and
  the display displaying a set of one or more items with respective fault scores based on a preset vehicle type category selected by user, wherein compiling the one or more sets of attribute values comprises:
  comparing an attribute value to a respective preset boundary condition;
  determining whether the attribute value is within the respective preset boundary condition; and
  removing the attribute value, when the attribute value is not within the respective preset boundary condition, and wherein the fault scores are calculated without the removed attribute value.

11. The apparatus of claim 10, wherein the one or more preset vehicle categories comprise one or more of vehicle types, vehicle components, vehicle depots, and vehicles.

12. The apparatus of claim 10, wherein the attribute values comprise one or more of hours of vehicle operation, a sum of fault durations, a count of faults that occurred, a sum of fault ages, and a maximum fault severity.

13. The apparatus of claim 10, wherein the respective preset boundary condition comprises a maximum attribute value.

14. The apparatus of claim 10, wherein the at least one processor is further operative to:
  calculate an attribute score for each attribute in the one or more sets using the attribute values and one or more boundary conditions;
  apply a preset attribute weight to the attribute score for each attribute in the one or more sets to generate a weighted attribute score for each attribute in the one or more sets; and
  sum the weighted attributes in each of the one or more sets to obtain fault scores for each of the one or more sets.

15. The apparatus of claim 10, wherein the at least one processor is further operative to:
  determine whether the user selected the preset vehicle category;
  continue to track faults, when the user has not selected the preset vehicle category; and
  determine the set of one or more items and corresponding fault scores of the preset vehicle category selected by the user, when the preset vehicle category is selected by the user.

16. The apparatus of claim 10, wherein the display displays a fault score meter having a plurality of bars for each fault score.

17. The apparatus of claim 10, wherein the display displays a numeric fault score, when the user selects an item of the preset vehicle category.

18. An article of manufacture for providing a vehicle component fault score, comprising a non-transitory machine readable medium containing one or more programs which when executed implement the steps of:
  tracking faults that occur on vehicle components in a plurality of vehicles;
  compiling one or more sets of attribute values for the tracked faults, wherein a set of attribute values within a respective preset boundary condition is collected for each item within one or more preset vehicle type categories;

calculating a fault score for each set of the compiled attribute values; and displaying a set of one or more items with respective fault scores based on a preset vehicle type category selected by a user, wherein compiling the one or more sets of attribute values comprises:

comparing an attribute value to a respective preset boundary condition;

determining whether the attribute value is within the respective preset boundary condition; and     removing the attribute value, when the attribute value is not within the respective preset boundary condition, and wherein the fault scores are calculated without the removed attribute value.

* * * * *